(12) United States Patent
Traut et al.

(10) Patent No.: US 11,562,174 B2
(45) Date of Patent: Jan. 24, 2023

(54) MULTI-FIDELITY SIMULATED DATA FOR MACHINE LEARNING

(71) Applicant: Microsoft Technology Licensing, LLC, Redmond, WA (US)

(72) Inventors: Eric Philip Traut, Snoqualmie, WA (US); Marcos de Moura Campos, Encinitas, CA (US); Ashish Kapoor, Kirkland, WA (US); Babak Seyed Aghazadeh, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 333 days.

(21) Appl. No.: 16/875,840

(22) Filed: May 15, 2020

(65) Prior Publication Data
US 2021/0357692 A1 Nov. 18, 2021

(51) Int. Cl.
*G06K 9/62* (2022.01)
*G06N 20/00* (2019.01)

(52) U.S. Cl.
CPC ......... *G06K 9/6257* (2013.01); *G06K 9/6262* (2013.01); *G06N 20/00* (2019.01)

(58) Field of Classification Search
CPC ........................... G06F 16/212; G06F 21/6227
USPC ............................................ 706/12; 705/7.11
See application file for complete search history.

(56) References Cited

U.S. PATENT DOCUMENTS

| | | | |
|---|---|---|---|
| 2021/0200760 A1* | 7/2021 | Bui | G06F 16/2474 |
| 2022/0029638 A1* | 1/2022 | Kim | H03M 13/2906 |
| 2022/0126319 A1* | 4/2022 | Richardson | G05B 13/0265 |
| 2022/0156595 A1* | 5/2022 | Kadayam Viswanathan | G06N 3/0454 |

OTHER PUBLICATIONS

Cutler, et al., "Reinforcement Learning with Multi-fidelity Simulators", In Proceedings of The IEEE International Conference on Robotics and Automation (ICRA), May 31, 2014, 9 Pages.
Kandasamy, et al., "Multi-fidelity Gaussian Process Bandit Optimisation", In Repository of arXiv:1603.06288v4, Mar. 15, 2019, 45 Pages.
"International Search Report and Written Opinion Issued in PCT Application No. PCT/US21/026737", dated Jul. 23, 2021, 12 Pages.
Andersen, et al., "The Dreaming Variational Autoencoder for Reinforcement Learning Environments", In Proceedings of International Conference on Innovative Techniques and Applications of Artificial Intelligence, Dec. 11, 2018, pp. 143-155.

(Continued)

*Primary Examiner* — Kiet M Doan
(74) *Attorney, Agent, or Firm* — Alleman Hall Creasman & Tuttle LLP

(57) ABSTRACT

A method of training a machine learning system. The method comprises collecting a first simulation dataset derived from a computer simulating a hypothetical scenario with a first simulation configuration having a first degree of fidelity. The method further comprises collecting a second simulation dataset derived from a computer simulating the hypothetical scenario with a second simulation configuration having a second degree of fidelity different than the first degree of fidelity. The method further comprises building a multi-fidelity training dataset including training data from both the first simulation dataset and the second simulation dataset according to an interleaving protocol.

19 Claims, 4 Drawing Sheets

(56) References Cited

OTHER PUBLICATIONS

Aydin, et al., "General Multi-Fidelity Framework for Training Artificial Neural Networks With Computational Models", In Journal of Frontiers in Materials, vol. 6, Apr. 17, 2019, pp. 1-14.
Suryan, et al., "Multi-Fidelity Reinforcement Learning with Gaussian Processes", In Repository of arXiv:1712.06489v1, Dec. 18, 2017, 9 Pages.

* cited by examiner

MULTI-FIDELITY SIMULATED DATA FOR MACHINE LEARNING

BACKGROUND

Machine learning systems may require large quantities of data for training. The data may be obtained by running computer simulations. However, computer simulations may incur a large computational expense which may be relatively higher for simulations having a relatively higher fidelity.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method of training a machine learning system includes collecting a first simulation dataset derived from a computer simulating a hypothetical scenario with a first simulation configuration having a first degree of fidelity. The method further comprises collecting a second simulation dataset derived from a computer simulating the hypothetical scenario with a second simulation configuration having a second degree of fidelity different than the first degree of fidelity. The method further comprises building a multi-fidelity training dataset including training data from both the first simulation dataset and the second simulation dataset according to an interleaving protocol.

DETAILED DESCRIPTION

Figure 1:
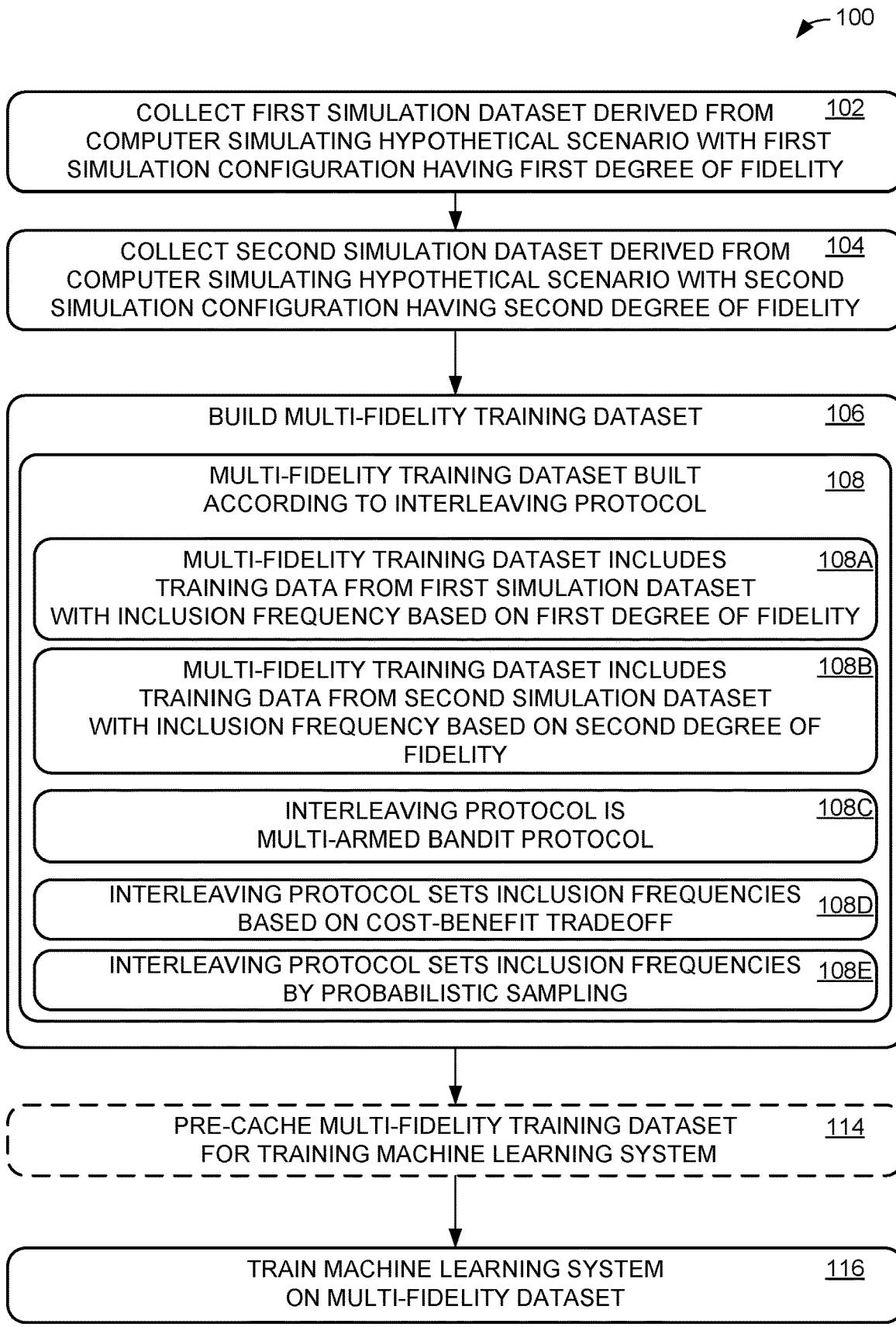
FIG. 1 shows a method of training a machine learning system.

Machine learning systems include various computational systems that are configured to make decisions, assess data, and perform other complex tasks based on assessing a machine learning model parametrized by a learned set of machine learning parameters. Parameters refer to any computational values (e.g., numerical values, text values, etc.) that determine behavior of a machine learning model. For example, the parameters may be parameters for evaluating a mathematical function with regard to a model input, wherein the parameters may be adjusted via training to obtain a desired behavior for the machine learning model. Machine learning systems may be configured, via machine learning training that adjusts the machine learning parameters, to solve diverse problems. As an example, machine learning systems may be trained to solve real-world tasks and/or interact with real-world systems. For example, a machine learning system may be trained to interact with one or more other computers (e.g., to send and receive information and/or invoke an application-programming interface associated with the other computer(s)). As another example, a machine learning system may be trained to control a robot or other hardware device, such as an autonomous vehicle (e.g., a quadcopter, an unmanned aircraft vehicle, or a self-driving car), an industrial manufacturing robot, a heat, ventilation and cooling (HVAC) system, and/or any other computer-controlled devices. As a non-limiting example, parameters for an autonomous vehicle may include numerical parameters of a neural network configured to receive an input representing sensor data measured by the vehicle and to evaluate the numerical parameters and the input to produce an output representing a next maneuvering action by the autonomous vehicle (e.g., increase/decrease motor rpm, increase/decrease rudder angle, and/or increase/decrease propeller angle).

Machine learning systems may be trained on suitable data (e.g., real and/or simulated data) via any suitable machine learning training methodology. Non-limiting examples of machine learning training methodologies include supervised learning, unsupervised learning, imitation learning, and/or reinforcement learning. A machine learning system may be trained using any suitable combination of one or more state-of-the-art and/or future machine learning training methodologies.

As one non-limiting example, a machine learning system may be trained via supervised learning with annotated training data, wherein an annotated training datum includes an input labeled with a corresponding desired output. Accordingly, the supervised learning system may be trained (e.g., by adjusting parameters of the system) to produce an output corresponding to a given input.

As another non-limiting example, a machine learning system may be trained via unsupervised learning to reproduce one or more features of a dataset. For example, a machine learning system may be trained, via unsupervised learning, to reproduce an input to the system based on a compressed internal representation of the input. As another non-limiting example, an unsupervised learning system may be trained to estimate a probability distribution with regard to the dataset. Non-limiting examples of unsupervised learning systems include autoencoders (e.g., variational autoencoders) and generative adversarial networks. For example, an unsupervised learning system may be trained to reproduce (e.g., sample and/or automatically generate) examples of data from the probability distribution.

As another example, a machine learning system may be trained via reinforcement learning to respond to an environmental context by selecting appropriate actions to perform in the environmental context. As a non-limiting example, a reinforcement machine learning computer system may be trained by allowing the system to explore an environment and adjusting parameters of the system based on results of its interactions with the environment. For example, a reinforcement machine learning computer system may include a machine learning model configured to receive sensory information regarding a "state space," comprising a multi-dimensional set of variables representing an internal state of the machine learning computer system (e.g., a variable associated with a robot) and/or an environment in which the reinforcement machine learning computer system is configured to operate, and based on the received information, to make a decision about a next action to perform. The reinforcement machine learning computer system may be trained by "rewarding" desirable outcomes and/or by "punishing" undesirable outcomes, via a programmer-defined "reward function."

As another non-limiting example, a machine learning system may be trained via imitation learning. In some examples, a machine learning system may be trained via imitation learning (e.g., instead of or in addition to reinforcement learning). For example, an imitation machine learning system may be trained to reproduce a plurality of exemplary behaviors specified in training data (e.g., human-provided examples of behaviors). The imitation machine learning system may be able to exactly reproduce exemplary behaviors and/or generalize to perform similar behaviors when confronted with new environmental contexts. Non-limiting examples of imitation machine learning methodologies include behavioral cloning, direct policy learning, inverse reinforcement learning, and generative adversarial imitation learning.

It is believed that machine learning computer systems may be configured, via machine learning training on suitable datasets, to solve complex real-world problems. For example, machine learning computer systems may be trained to control physical systems (e.g., controlling a robot), make predictions and/or classifications with regard to data (e.g., identifying a probability that an object is present in an image), etc. As a non-limiting example, given suitable training, reinforcement machine learning computer systems may be able to succeed at human-level strategic game play, industrial control, calibration, logistics, and/or other fields of endeavor. The above examples are non-limiting. With suitable training data, it is believed that machine learning systems may be generally configured to perform diverse computational and/or real-world tasks.

However, machine learning systems may require a large plurality of data examples for training (e.g., hundreds, thousands, millions, or more examples). Generation of sufficient data for training may be a significant cost of training a machine learning system. For example, data regarding the performance of a robot in a manufacturing scenario may be costly to obtain due to operating costs associated with actually operating the robot, using materials, etc. Accordingly, in some examples, a machine learning system may be trained using simulated data. For example, a machine learning system for controlling a robot in a manufacturing scenario may be trained with training data acquired via running computer simulations of the robot operating in a simulated environment, so that the actual robot may be trained without actually operating Such simulations may be conducted much faster and at lower cost when compared to equivalent real world experiments in which the robot is actually operated to acquire training data. As another example, real-world data may be difficult and/or expensive to gather, e.g., due to a cost of operating measuring equipment, a cost to pay humans to collect and/or curate data, etc. As another example, data regarding human behavior may be costly to collect due to sensitivity and/or privacy of the data. Accordingly, simulated data may be used instead of and/or in addition to real-world data, for training a machine learning system.

However, even using simulated data may incur substantial expenses. For example, the processing and/or storage of simulation data may require substantial computational resources (e.g., computer processing bandwidth, storage space, and/or network communication bandwidth). As such, generating sufficient data to train a machine learning system may be a substantial cost of training the system even when simulated data is used. In some examples, computer simulation for generating training data may operate at different levels of fidelity. A simulation having a relatively lower fidelity may require fewer computational resources. However, while a lower-fidelity simulation may require fewer computational resources relative to a higher-fidelity simulation, a machine learning system trained on data from a lower-fidelity simulation may achieve relatively inferior results as compared to a machine learning system trained on data drawn from a higher-fidelity simulation.

Accordingly, the present disclosure is directed to generating datasets for machine learning training using a multi-fidelity training dataset drawn from a plurality of different simulations having different levels of fidelity. The multi-fidelity training dataset is built out of two or more simulation datasets according to an interleaving protocol configured to set a desired mix of training data having different relative fidelities. For example, the interleaving protocol may be configured to determine inclusion frequencies for data from the first simulation dataset and the second simulation dataset, based on fidelities associated with the first simulation dataset and the second simulation dataset.

"Simulation dataset" may be used herein to refer to any suitable collection of data from a simulation that may be used for training a machine learning system. In some examples, a degree of fidelity for a simulation dataset is based on an estimated predictive accuracy of the simulation. In some examples, a degree of fidelity for a simulation dataset is based on a user-defined importance score.

"Inclusion frequency" may be used herein to refer to any suitable quantification of an amount of training data in the multi-fidelity training dataset that was collected from a particular simulation dataset having a particular degree of fidelity. For example, an inclusion frequency may refer to a proportion of the multi-fidelity training dataset drawn from a particular simulation dataset, a likelihood of sampling from a particular dataset to collect data for the multi-fidelity training dataset, and/or a likelihood of sampling data from the multi-fidelity training dataset that was drawn from a particular simulation dataset. For example, the multi-fidelity training dataset may include relatively more of higher-fidelity data as compared to lower-fidelity data. As another example, the multi-fidelity training dataset may include at least a pre-defined threshold proportion of data having at least a predefined threshold fidelity value. In general, the multi-fidelity data may be collected so as to improve a training benefit of the data, relative to an expense of collecting the data.

"Fidelity" may be used herein to refer to any quantification of the overall quality (e.g., "goodness" or suitability for training) of a simulation with regard to generating data for training. A simulation may have an associated fidelity based on accuracy, computational cost of running the simulation, user preference, and/or any other suitable combination of the above or other factors. For example, a simulation may have an associated resolution (e.g., in terms of a number and/or size of simulated elements). As an example, a soil dynamics simulation is configured to estimate bulk behavior of soil particles, e.g., during an excavation operation. Accordingly, the soil dynamics simulation may be configured with various degrees of fidelity in which a high-fidelity configuration may simulate soil particles of a size of 1 mm or smaller, and a low-fidelity operation may simulate soil particles of a size of 1 cm or bigger. As another non-limiting example, an aerodynamics simulation for a flying drone in a low-fidelity configuration may simulate the drone shape as a simple sphere or cube, whereas the aerodynamics simulation in a high-fidelity configuration may simulate the drone as a detailed three-dimensional mesh. In some examples, fidelity may be a configurable parameter of a simulation (e.g., fidelity parameter for determining soil size or fidelity parameter for determining aerodynamic mesh detail). In some examples, fidelity of a simulation may be automatically determined based on measured accuracy and/or computational cost. In other examples, fidelity may be manually determined (e.g., assessed by a programmer of a machine learning system).

FIG. 1 shows an example method 100 for training a machine learning system, using data collected from a plurality of different simulations having different associated fidelities. For example, method 100 may be performed by a computing system 300 as described below with regard to FIG. 3. Although the present disclosure is described with regard to using simulated data having different associated fidelities, accuracy, and/or cost, the techniques described herein may be similarly applied to machine learning training using any suitable combination of real and/or simulated data. For example, a multi-fidelity training dataset may be built out of a combination of real and simulated data having different associated fidelities.

Method 100 intelligently selects how to use data from multiple different simulations having different levels of fidelity, to improve or even maximize a training benefit of data from the different simulations relative to a computational expense of collecting the data from the different simulations. A multi-fidelity dataset including results from the different simulations may be used to train a machine learning system configured using various approaches (e.g., any combination of machine learning methodologies described above, such as supervised, unsupervised, reinforcement, and/or imitation learning).

At 102, method 100 includes collecting a first simulation dataset derived from a computer simulating a hypothetical scenario with a first simulation configuration having a first degree of fidelity. At 104, method 100 includes collecting a second simulation dataset derived from a computer simulating the hypothetical scenario with a second simulation configuration having a second degree of fidelity different than the first degree of fidelity. Although method 100 is described with regard to building a multi-fidelity dataset out of two different simulation datasets having two different degrees of fidelity, the techniques of the present disclosure are not so limited and may be applied to build a multi-fidelity dataset out of any suitable number of different simulation datasets, having any suitable degrees of fidelity. Accordingly, the first simulation dataset and the second simulation dataset may be two of a larger plurality of simulation datasets, and the multi-fidelity training dataset may be built from training data from any number of the larger plurality of simulation datasets.

Simulation datasets may be collected from any suitable data sources. For example, simulation datasets may be collected locally at a computer executing method 100, and/or remotely by communicatively coupling to one or more external computers configured to provide simulation datasets. In some examples, a simulation dataset may be maintained in a cache (e.g., generated and pre-cached for training the machine learning system). In other examples, a simulation dataset may be generated on-the-fly on an as-needed basis. In other words, the techniques of the present disclosure may be used for generating data using a simulator (e.g., in a pre-cached dataset) and/or for using such data to train a machine learning model. In some examples, generation of all data may occur before training of the machine learning model begins. However, in other examples, data generation may be performed during the training of the machine learning model. As an example, the simulation dataset may be generated by executing one or more iterations of machine learning training, and during the machine learning executing a simulation to generate new data as such data is needed for an iteration of the machine learning training.

In some examples, generation of the simulation dataset may be controlled based on the training procedure. For example, the generation may be configured to select training data that results in a more advantageous adjustment to machine learning parameters during the machine learning training. For example, an interleaving protocol that controls the selection of data may be adjusted based on results and/or measurements of progress associated with the machine learning training. As a non-limiting example, in a reinforcement machine learning scenario, a simulator may be invoked on demand to generate a data trace used for training a reinforcement machine learning model. Accordingly, the data trace may be added to a multi-fidelity training dataset and used to train/re-train the reinforcement machine learning system. Furthermore, each invocation of a simulator (e.g., to generate more training data) may be tailored to an outcome of the training procedure so far. Although the above example is described with regard to a reinforcement machine learning scenario, multi-fidelity simulation data-sets may be generated on-the-fly and as-needed, and/or pre-cached, for other machine learning scenarios such as imitation learning, supervised learning, and/or unsupervised learning.

In some examples, a simulation configuration may require a large amount of computational resources to run. For example, it may be computationally prohibitive to gather sufficient data from a high-fidelity and/or computationally expensive simulation configuration. Nevertheless, the present disclosure still allows for gathering simulation data based on the expensive simulation configuration, by emulating the expensive simulation configuration with a computationally efficient simulator based on one or more machine learning systems. For example, an efficient simulator may be built by using supervised machine learning to train a variational autoencoder simulation to emulate a different, more expensive, simulation configuration. Variational autoencoders may be implemented using any suitable combination of state-of-the-art and/or future machine learning techniques, for example, based on a deep neural network or any other machine learning model. As a non-limiting example, a variational autoencoder may be trained via supervised learning on a plurality of labeled execution traces of another simulation configuration, wherein a labeled execution trace includes an input to the other simulation and/or computational steps performed in the other simulation (e.g., in response to the input).

At 106, method 100 further includes building a multi-fidelity training dataset including data from both of the first simulation dataset and the second simulation dataset. As shown at 108, the multi-fidelity training data set may be built in accordance with an interleaving protocol.

As described at 108A, in some examples, the multi-fidelity training dataset includes data from the first simulation dataset with an inclusion frequency based at least on the first degree of fidelity. Similarly, in some examples, as described at 108B, the multi-fidelity training dataset includes data from the second simulation dataset with an inclusion frequency based at least on the second degree of fidelity. More generally, the interleaving protocol may be configured to set the relative inclusion frequency in accordance with the relative fidelities of the different simulation datasets.

Alternately or additionally, as shown at 108C, the interleaving protocol may be a multi-armed bandit (MAB) protocol for solving multi-armed bandit problems in which a limited and/or partially unknown set of resources are allocated to optimize a resulting reward. The interleaving protocol may be implemented with any suitable combination of state-of-the-art and/or future multi-armed bandit problem-solving techniques.

Alternately or additionally, as shown at 108D, the interleaving protocol may set the first inclusion frequency and the second inclusion frequency based on a cost-benefit trade-off between the first simulation configuration and the second simulation configuration. For example, the interleaving protocol may automatically adjust an inclusion frequency for a simulation dataset to be relatively lower, based on that simulation having a relatively higher computational cost.

In some examples, generation of the multi-fidelity dataset is controlled based on an estimated value of simulation for the different simulation configurations. For example, the expected value of simulation may be determined for a simulation configuration based on a trade-off between an estimated cost of running the simulation configuration and an estimated utility for training the machine learning system on data derived from the simulation configuration. For example, the estimated value of simulation may be a numerical quantity that quantifies how valuable a simulation run is estimated to be for the training, based on an estimate of utility (e.g., usefulness) towards a task of interest and/or based on an estimated cost of invoking a simulation.

The expected value of simulation may be used to determine which simulator(s) to invoke for generating training data (e.g., when generating data on-the-fly on an as-needed basis during training, and/or for creating a pre-cached multi-fidelity dataset). For example, an interleaving protocol for multi-fidelity dataset generation may be controlled based on the expected values of simulation for the different simulation configurations.

In some examples, the estimate of utility and/or the estimated cost may be based at least on a history of training runs that a machine learning system has executed so far, e.g., training runs conducted using data previously generated by the interleaving protocol. For example, estimated cost may be based on measured and/or predicted costs in terms of computational resources to execute a simulation configuration. As another example, estimated utility may be based on measured and/or predicted utility in terms of an impact on accuracy, performance, and/or any other characteristics of the machine learning system resulting from training using the multi-fidelity dataset.

Alternately or additionally, as shown at 108E, the interleaving protocol may set the first inclusion frequency and the second inclusion frequency based on probabilistically sampling from the first simulation dataset with a sampling likelihood in proportion to the first degree of fidelity, and by probabilistically sampling from the second simulation dataset with a sampling likelihood in proportion to the second degree of fidelity. The interleaving protocol may incorporate any suitable combination of 108A-108E and/or other suitable selection strategies.

As described at 114, in some examples method 100 further includes pre-caching the multi-fidelity training dataset for training a machine learning system.

At 116, method 100 further includes training a machine learning system on the multi-fidelity training dataset. The multi-fidelity training dataset may be used with any suitable training methodology. As a non-limiting example, a supervised learning system may be trained to replicate traces generated by one or more simulators based on input(s) to the simulator(s). As another example, for reinforcement learning the multi-fidelity training dataset may be used as an environmental context for reinforcement learning. In some examples, in addition to adding data to the multi-fidelity dataset based on fidelity, a training weight value may be assigned to data drawn from each simulated dataset. For example, the training weight value may be assigned based on a fidelity of the dataset, wherein higher-weighted data with a higher fidelity has a larger impact on training relative to lower-weighted data with a lower fidelity. In other examples, the fidelity and training weight value may be independent. In general, the training weight moderates the effect of the data when encountered during training.

Figure 2A:
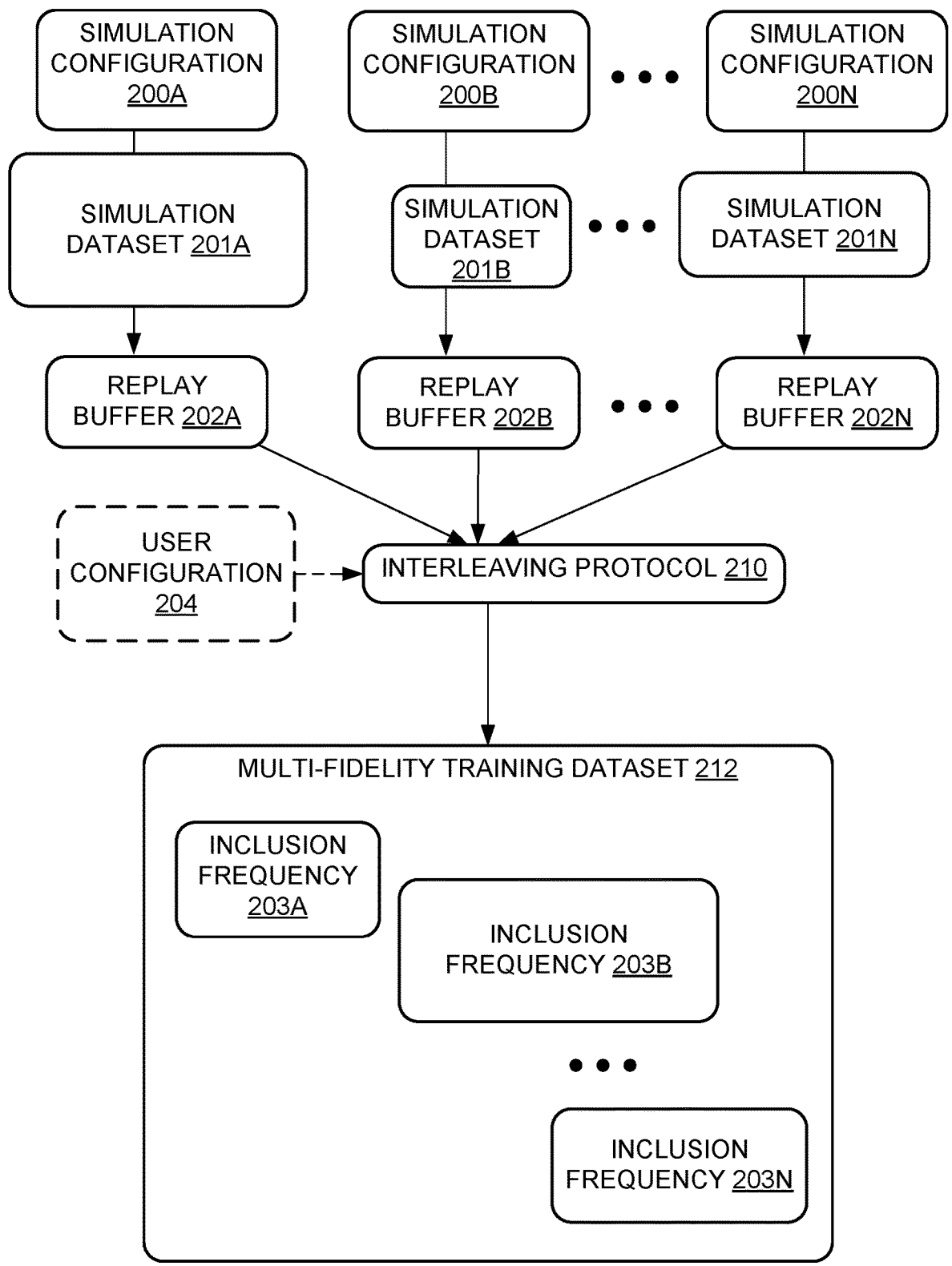
FIGS. 2A and 2B graphically depict an exemplary data flow architecture for selecting data from two different datasets of different fidelity according to an interleaving protocol.
Figure 2B:
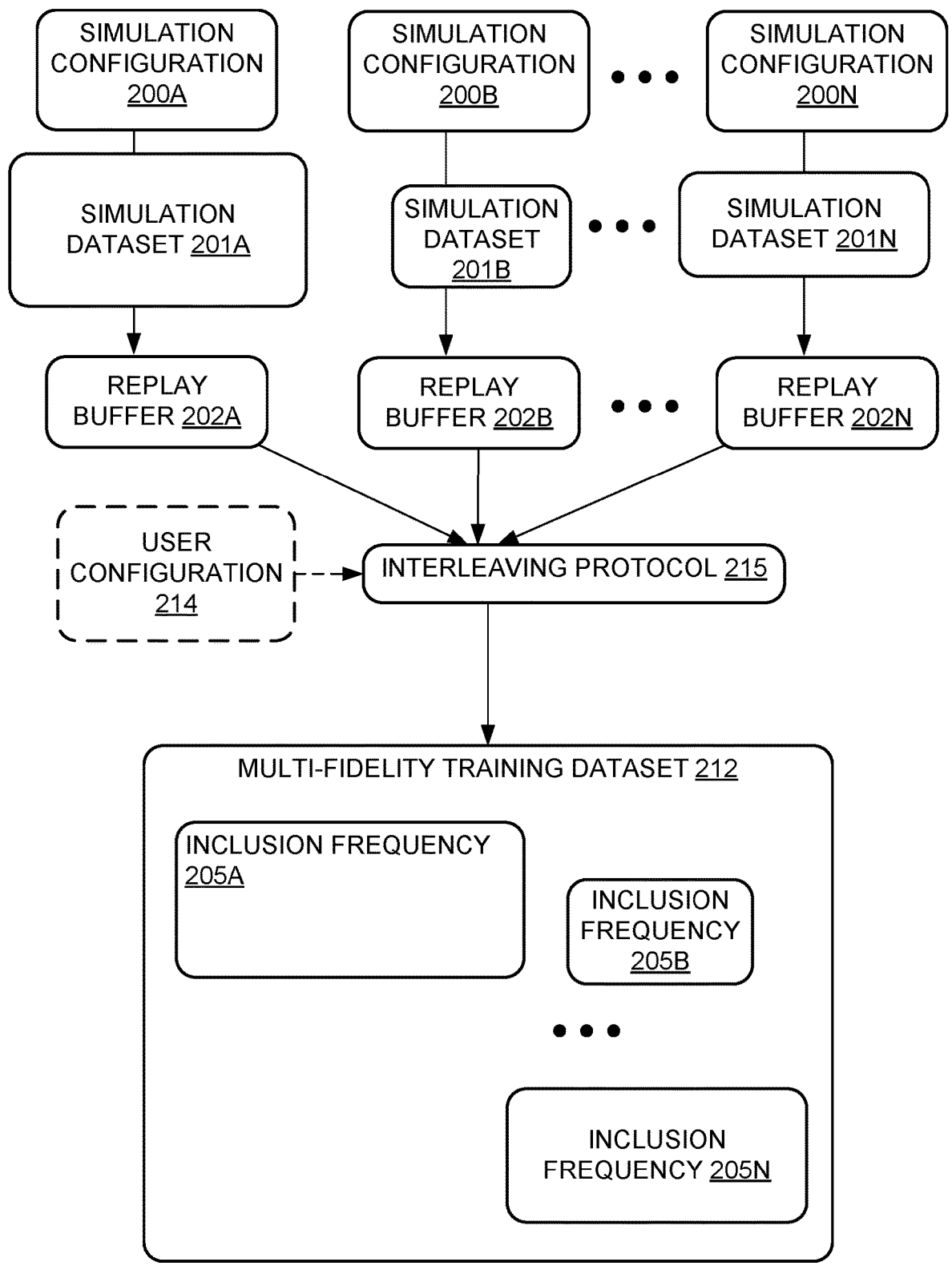

FIG. 2A shows an exemplary data flow architecture for selecting data from different simulations having different fidelities, according to an interleaving protocol 210. For example, FIG. 2B shows a plurality of simulation configurations including simulation configuration 200A, simulation configuration 200B, and further simulation configurations through simulation configuration 200N.

As shown in FIG. 2, simulation dataset 201A from a first simulation configuration 200A is collected into a first replay buffer 202A. Similarly, simulation dataset 201B from a second, different simulation configuration 200B is collected into a second replay buffer 202B, As represented by simulation configuration 200N, simulation dataset 201N, and replay buffer 202N, any number of simulation datasets from different simulation configurations may be collected into corresponding replay buffers.

As a non-limiting example, data in a two-source scenario may be drawn, according to the interleaving protocol 210, from simulation configuration 200A and simulation configuration 200B. In an example, the interleaving protocol 210 is configured to set an inclusion frequency of x for simulation configuration 200A and y for simulation configuration 200B. Accordingly, the example, data is selected from simulation configuration 200A in x out of a total of n cases and from simulation configuration 200B in y out of n cases. The inclusion frequencies (e.g., x, yin the example above) are dictated by the interleaving protocol.

Interleaving protocol 210 may be configured for any suitable selection method to select a subset of data drawn from each replay buffer for a multi-fidelity dataset 212, e.g., based on any suitable combination of one or more criteria (e.g., fidelity, a cost associated with collecting the data from a simulation configuration, and/or user configuration 204). For example, interleaving protocol may be configured as illustrated at 108A, 108B, 108C, 108D, and/or 108E of FIG. 1.

In some examples, interleaving protocol 210 may be controlled at least in part by a user configuration 204. For example, user configuration 204 may specify different weights to use for different datasets and/or different weights to use for data having different associated fidelities. For example, user configuration 204 can define a user-defined importance for each simulation based on user preference, cost, accuracy, or any other factors. Alternately or additionally, user configuration 204 may specify any other settings pertaining to a multi-fidelity training dataset, e.g., number of data in a batch and/or number of data in the whole dataset.

Multi-fidelity training dataset 212 may be used for machine learning training in any suitable training methodology, e.g., for supervised, unsupervised, reinforcement, and/or imitation learning as described above.

Based on the interleaving protocol 210, multi-fidelity training dataset 212 includes data from first simulation dataset 201A with a first inclusion frequency 203A, data from second simulation dataset 201B with a second inclusion frequency 203B, and data from third simulation dataset 201N with a third inclusion frequency 203N. The inclusion frequencies for the respective datasets are determined by the interleaving protocol 210 as described above. FIG. 2B uses the relative size of the inclusion frequency boxes to visually represent differences in the inclusion frequencies (i.e., inclusion frequency 203B is larger than inclusion frequency 203A, indicating that multi-fidelity training dataset 212 includes more training data from simulation configuration 200B than from simulation configuration 200A. As depicted in FIG. 2A, the inclusion frequencies need not be scaled with the original size of the datasets. For example, simulation dataset 201A may include a relatively large amount of low-fidelity data, as compared to a smaller amount of higher-fidelity data in simulation dataset 201B. Nevertheless, multi-fidelity training dataset 212 may include a relatively larger amount of higher-fidelity data from simulation dataset 201B so that inclusion frequency 203B is larger than inclusion frequency 203A.

Although FIG. 2A depicts a scenario in which the multi-fidelity training dataset 212 has a larger inclusion frequency 203B of data from simulation dataset 201B relative to inclusion frequency 203A of data from simulation dataset 201A, different compositions of multi-fidelity training datasets may be produced using the techniques of the present disclosure. For example, as compared to the composition shown in FIG. 2A, a multi-fidelity dataset might benefit from higher-fidelity data overall (e.g., less data from lower-fidelity sources and/or more data from higher fidelity sources), more data overall (e.g., more data from lower-fidelity sources when such data is available).

FIG. 2B shows a similar dataflow to FIG. 2A, but with a different interleaving protocol 215. For example, the different interleaving protocol may be selected based on a different user configuration 214. Based on the different interleaving protocol 215, multi-fidelity training dataset 212 includes data from simulation dataset 201A with a relatively higher inclusion frequency 205A, as compared to inclusion frequency 205B or inclusion frequency 205N.

The methods described herein provide flexibility in creating datasets for machine learning training. Multi-fidelity training datasets composed from multiple data sources may provide high-fidelity data and/or lower-fidelity data in suitable quantity for machine-learning training. The techniques of the present disclosure may be used to build a multi-fidelity training dataset of any desired composition by using a suitable interleaving protocol (e.g., such as interleaving protocols 210 or 215 described above). Accordingly, multi-fidelity training datasets built according to a suitable interleaving protocol may facilitate improved training of diverse state-of-the-art and/or future machine learning systems.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 3:
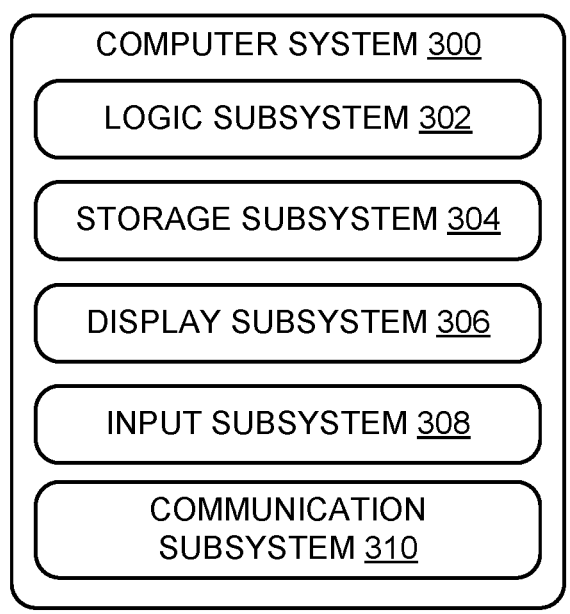
FIG. 3 shows an exemplary computing system.

FIG. 3 schematically shows a simplified representation of a computing system 300 configured to provide any to all of the compute functionality described herein. Computing system 300 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 300 includes a logic subsystem 302 and a storage subsystem 304. Computing system 300 may optionally include a display subsystem 306, input subsystem 308, communication subsystem 310, and/or other subsystems not shown in FIG. 3. For example, computing system 300 may implement method 100. As another example, computing system 300 may implement the dataflow architecture of FIG. 2A or 2B. As another example, computing system 300 may implement an interleaving protocol 210.

The exemplary computer system shown in FIG. 3 is one non-limiting example of a computer system for collecting training data for machine learning training. The data-collection methodology described in the present disclosure may be applied in any computational context (e.g., using different computer system(s) and/or different network connectivity as compared to FIG. 3).

Logic subsystem 302 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 304 includes one or more physical devices configured to temporarily and/or permanently hold computer information such as data and instructions executable by the logic subsystem. When the storage subsystem includes two or more devices, the devices may be collocated and/or remotely located. Storage subsystem 304 may include volatile, nonvolatile, dynamic, static, read/write, read-only, random-access, sequential-access, location-addressable, file-addressable, and/or content-addressable devices. Storage subsystem 304 may include removable and/or built-in devices. When the logic subsystem 302 executes instructions, the state of storage subsystem 304 may be transformed—e.g., to hold different data.

Aspects of logic subsystem 302 and storage subsystem 304 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. For example, reinforcement machine learning model configuration 108 may be configured according to any suitable combination of ML, AI, and/or NLP techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement machine learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 306 may be used to present a visual representation of data held by storage subsystem 304. This visual representation may take the form of a graphical user interface (GUI). Display subsystem 306 may include one or more display devices utilizing virtually any type of technology. In some implementations, display subsystem may include one or more virtual-, augmented-, or mixed reality displays.

When included, input subsystem 308 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 310 may be configured to communicatively couple computing system 300 with one or more other computing devices. For example, computing system 300 may be configured to communicatively couple to one or more external computers to collect one or more simulation dataset(s). Communication subsystem 310 may include wired and/or wireless communication devices compatible with one or more different communication protocols. The communication subsystem may be configured for communication via personal-, local- and/or wide-area networks.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of training a machine learning system, the method comprising:
   collecting a first simulation dataset derived from a computer simulating a hypothetical scenario with a first simulation configuration having a first degree of fidelity;
   collecting a second simulation dataset derived from a computer simulating a hypothetical scenario with a second simulation configuration having a second degree of fidelity relatively lower than the first degree of fidelity;

building a multi-fidelity training dataset including simulated training data from the first simulation dataset with a first inclusion frequency based on the first degree of fidelity, and the second simulation dataset with a second inclusion frequency based on the second degree of fidelity, the multi-fidelity training dataset including simulated training data derived from simulating the same types of hypothetical scenarios with relatively higher and relatively lower degrees of fidelity; and training a machine learning system on the multi-fidelity training dataset.

2. The method of claim 1, wherein the first and second degrees of fidelity are based on a user-defined importance score.

3. The method of claim 1, wherein collecting the first simulation dataset includes running the first simulation configuration at the first degree of fidelity.

4. The method of claim 1, wherein the first simulation configuration includes a variational autoencoder simulation.

5. The method of claim 4, wherein the variational autoencoder simulation is trained to emulate a different simulation configuration.

6. The method of claim 5, wherein training the variational autoencoder simulation includes supervised learning on a plurality of execution traces from another simulator configuration.

7. The method of claim 1, wherein the first simulation dataset and the second simulation dataset are two of a larger plurality of simulation datasets, wherein the multi-fidelity training dataset is built from training data from each of the plurality of simulation datasets.

8. The method of claim 1, wherein the multi-fidelity training dataset is built according to an interleaving protocol that sets the first inclusion frequency and the second inclusion frequency based at least on the first degree of fidelity and the second degree of fidelity.

9. The method of claim 8, wherein the interleaving protocol is a multi-armed bandit protocol.

10. The method of claim 8, wherein the interleaving protocol sets the first inclusion frequency and the second inclusion frequency further based on a cost-benefit trade-off between the first simulation configuration and the second simulation configuration.

11. The method of claim 8, wherein the interleaving protocol sets the first inclusion frequency and the second inclusion frequency further based on probabilistically sampling from one or both of the first simulation dataset in proportion to the first degree of fidelity and the second simulation dataset in proportion to the second degree of fidelity.

12. The method of claim 1, wherein the multi-fidelity training dataset is pre-cached for training the machine learning system.

13. The method of claim 1, wherein at least a portion of one or both of the first simulation dataset and the second simulation dataset included in the multi-fidelity training data is generated during training of the machine learning system.

14. The method of claim 1, wherein the machine learning system is configured for reinforcement learning.

15. The method of claim 1, wherein the machine learning system is configured for imitation learning.

16. The method of claim 1, wherein the machine learning system is configured for supervised learning.

17. The method of claim 1, wherein the machine learning system is configured for unsupervised learning.

18. A method of providing training data to a machine learning system, the method comprising:

estimating a first expected value of simulation for a first simulation configuration having a first degree of fidelity based on an estimated cost of running the first simulation configuration and an estimated utility for training the machine learning system on data derived from the first simulation configuration;

estimating a second expected value of simulation for a second simulation configuration having a second, relatively lower degree of fidelity based on an estimated cost of running the second simulation configuration and an estimated utility for training the machine learning system on data derived from the second simulation configuration; and training the machine learning system on a multi-fidelity training dataset including simulated training data from both the first simulation configuration and the second simulation configuration based on the first expected value of simulation for the first simulation configuration and the second expected value of simulation for the second simulation configuration, the multi-fidelity training dataset including simulated training data derived from simulating the same types of hypothetical scenarios with relatively higher and relatively lower degrees of fidelity.

19. A computer system configured to generate training data for machine learning training, comprising:

a logic machine; and a storage machine holding instructions executable by the logic machine to:

collect a first simulation dataset derived from a simulator computer simulating a hypothetical scenario with a first simulation configuration having a first degree of fidelity;

collect a second simulation dataset derived from a simulator computer simulating a hypothetical scenario with a second simulation configuration having a second, relatively lower degree of fidelity different than the first degree of fidelity;

build a multi-fidelity training dataset including simulated training data from both the first simulation dataset and the second simulation dataset according to an interleaving protocol that sets the first inclusion frequency and the second inclusion frequency based at least on the first degree of fidelity and the second degree of fidelity, the multi-fidelity training dataset including simulated training data derived from simulating the same types of hypothetical scenarios with relatively higher and relatively lower degrees of fidelity; and train a machine learning system on the multi-fidelity training dataset.

* * * * *